(12) United States Patent
  Clapper (10) Patent No.: US 6,693,515 B2
(45) Date of Patent: Feb. 17, 2004

(54) SEQUENCED AUDIO HELP LABEL

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 09/970,533

(22) Filed: Oct. 3, 2001

(65) Prior Publication Data

US 2003/0064353 A1 Apr. 3, 2003

(51) Int. Cl.⁷ .................................................. G08B 3/10
(52) U.S. Cl. ............................. 340/384.7; 340/384.1; 340/692; 340/825.15; 340/825.24; 340/825.54
(58) Field of Search ....................... 340/384.7, 384.1, 340/692, 825.15, 825.24, 825.54

(56) References Cited

U.S. PATENT DOCUMENTS

| | | | | |
|---|---|---|---|---|
| 4,891,835 A | * | 1/1990 | Leung et al. ................. | 379/88 |
| 4,924,519 A | * | 5/1990 | Beard .......................... | 381/51 |
| 5,583,935 A | * | 12/1996 | Dunchock .................... | 379/454 |
| 5,604,479 A | * | 2/1997 | Chang ......................... | 340/384.7 |
| 5,648,760 A | * | 7/1997 | Kumar ......................... | 340/825.25 |
| 5,810,420 A | * | 9/1998 | Welling ........................ | 296/97.5 |
| 5,890,121 A | | 3/1999 | Borcherding | |
| 5,894,275 A | * | 4/1999 | Swingle ........................ | 340/692 |
| 5,905,429 A | * | 5/1999 | Hornstein et al. ........ | 340/386.6 |

FOREIGN PATENT DOCUMENTS

WO   WO 94/20951   9/1994

* cited by examiner

Primary Examiner—Jeffery Hofsass
Assistant Examiner—Hung Nguyen
(74) Attorney, Agent, or Firm—Trop, Pruner & Hu, P.C.

(57) ABSTRACT

A sequenced audio help label having a plurality of recorded audio messages that are played back in a predetermined sequence, one at a time, in response to a user activating a button or trigger to signal play of the next message. The label may be affixed to e.g. consumer electronic devices as a quick-start help reference system for users. In some embodiments, the messages are pre-recorded, but, in others, the user may record the messages.

27 Claims, 6 Drawing Sheets

SEQUENCED AUDIO HELP LABEL

BACKGROUND OF THE INVENTION

1. Technical Field of the Invention

The present invention relates generally to audio playback devices, and more particularly to an audio label such as may be affixed to consumer devices or the like to provide audio help in setting up or using such devices.

2. Background Art

Figure 1:
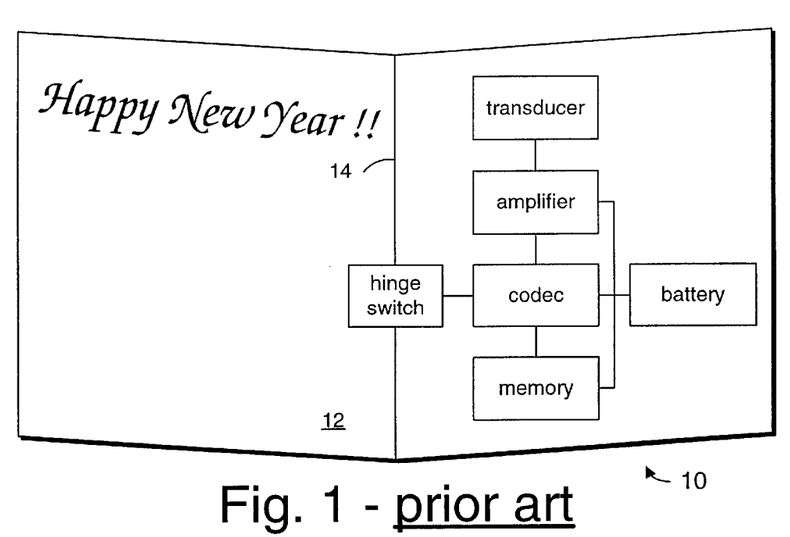
FIG. 1 shows a block diagram representation of a musical greeting card according to the prior art.

FIG. 1 illustrates, in block diagram form, an audio or musical greeting card 10 such as are known in the prior art. As with conventional greeting cards, the musical greeting card includes a body 12 which is typically made of stiff paper that is folded at one or more folds 14, and which may bear a pre-printed greeting such as "Happy New Year!!" or the like. The musical greeting card contains a memory in which is encoded digital data or other representation of the musical or audio greeting to be played, a codec for retrieving that data from the memory and converting it to an analog waveform which is supplied to an amplifier which amplifies the signal and provides it to a piezo-electric transducer or other suitable speaker mechanism for audible playback of the encoded tune or message. A battery provides electrical power for these operations. The playback is triggered by a hinge switch that activates in response to the card being folded open at the hinge.

Such an audio greeting card plays only the single pre-recorded message or tune, which has been programmed into the memory at manufacturing time. Also, the message or tune is played from its beginning upon activation of the hinge switch, and will either play to completion then stop, or will play repeatedly. Typically, play is aborted if the hinge switch detects that the card has been closed or folded shut.

Thus, there is no sequencing mechanism in such cards, to facilitate advancement from one audio tune or message to another, nor for rewinding from a present message to a prior message.

Figure 2:
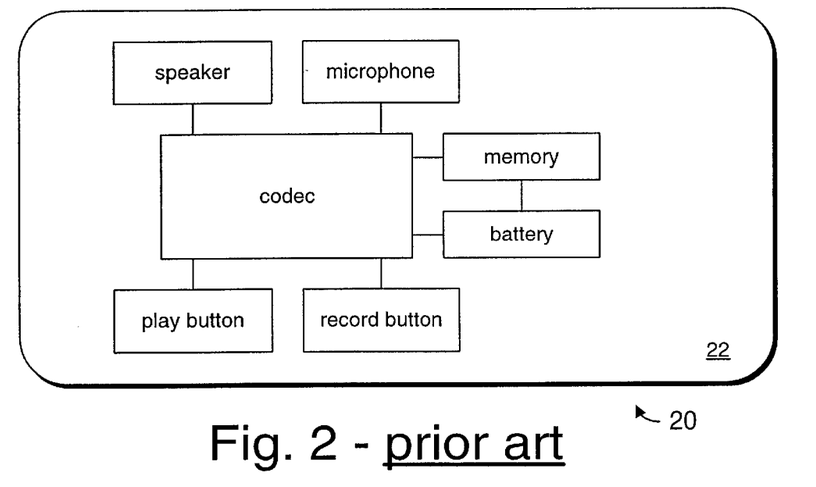
FIG. 2 shows a block diagram of a solid-state dictation device, or a child's audio playback toy, according to the prior art.

FIG. 2 illustrates, in block diagram form, a solid-state dictation recorder 20 or, alternatively, a similar device embodied as a child's toy, such as are now available at toy stores. The recorder includes a battery for providing electrical power, a codec for performing audio encoding and decoding operations, a memory for storing dynamically recorded audio messages as encoded by the codec, a speaker (and in some cases an amplifier, not shown) for audio playback of such recorded messages, a microphone for inputting new audio messages to be recorded, and one or more controls such as a record button and a play button (and in the case of some dictation recorders, a rewind button and a fast-forward button).

Such dictation recorders record what amounts to a single audio message. They do so in a linear manner, albeit with the ability for the user to rewind and record over parts of a previously recorded message. Similarly, playback consists essentially of the linear playback of a single audio message, albeit with the ability to rewind or fast-forward, pause, and stop.

Such children's toys lack even those abilities, and are only capable of recording a single message in a strictly linear manner; recording begins when the record button is pressed, continues while it remains depressed, then ends when it is released. Playback consists only of linear playback of the complete message, except if the play button is again pressed while the message is already playing, in which case the message will be immediately restarted from its beginning.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 3:
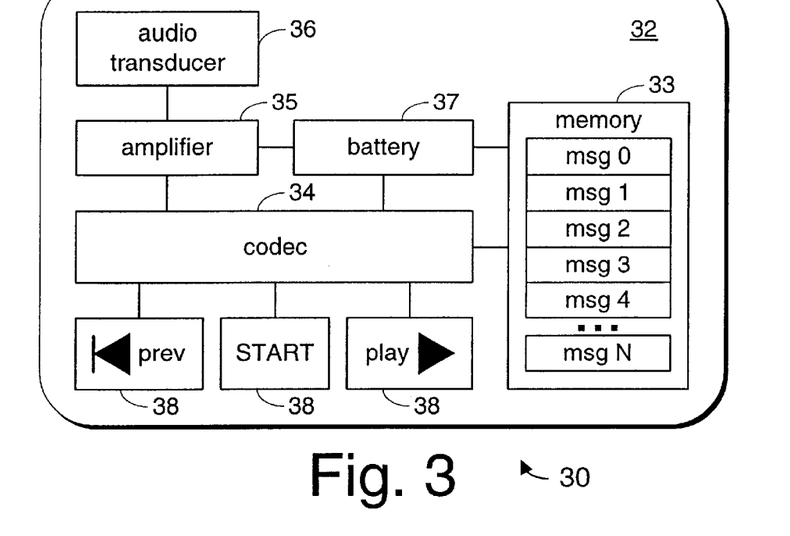
FIG. 3 shows a block diagram of one embodiment of a sequenced audio help label according to the present invention.

FIG. 3 illustrates, in block diagram form, one illustrative or exemplary embodiment of the present invention. The invention in this embodiment is a sequenced audio help label 30 which has a body 32 such as a body made of rigid plastic, flexible plastic, or other suitable means. In some embodiments, the body may consist merely of a protective film overlying the functional elements, to protect them from the elements. In some embodiments, it may be possible to fabricate all or nearly all of the components of the apparatus as a flex circuit or even perhaps a monolithic device.

In the embodiment shown, the label 30 includes a memory 33 for holding a sequence of audio messages (msg 0-N). The memory may be programmed at manufacturing time, such as in the case where the memory is formed as an integrated circuit in which the audio message data are represented in the circuits, interconnects, or otherwise; for example, the memory may be a read-only memory (ROM). Alternatively, the memory may be empty at its moment of manufacture, but later be programmed with a pre-recorded audio sequence; for example, the memory may be a programmable read-only memory (PROM), or a flash memory chip which, after being programmed, has a fuse blown or other write-control means activated to prevent erasure or over-writing of the audio sequence.

The label includes a codec 34 for retrieving data from the memory and converting them into an analog waveform which is provided to an amplifier 35 which, in turn, provides the amplified signal to an audio output means 36 such as a film-transducer, speaker, piezo-electric crystal, or other suitable audio output mechanism. A battery 37 provides electrical power for these operations.

The label further includes one or more playback sequence control devices 38 which, in one embodiment, may be formed as plastic dome switches, which are well known in their art. Alternatively, they could be, for example, capacitive sensors such as those found on the keypads of some microwave ovens, or they could be any other suitable construction.

In one embodiment, the set of controls may include a start button ("START") which initializes playback of the sequence of audio messages at the first message in the sequence (e.g. msg 0), a button ("prev") which causes playback to jump back to the beginning of the current message or an immediately previous message, and a button ("play") which advances from the current message (which may have run to completion). In other embodiments, the controls may be generically labeled, e.g. "1" and "2" and "3" etc. In some embodiments, there may be dedicated controls with specifically indicated functions such as "Help" or "Press to Start" or "Rewind Five Seconds" or other suitable suggestions. The particular buttons and functions chosen are, of course, optional and should be chosen to best suit the particular application at hand.

Figure 4:
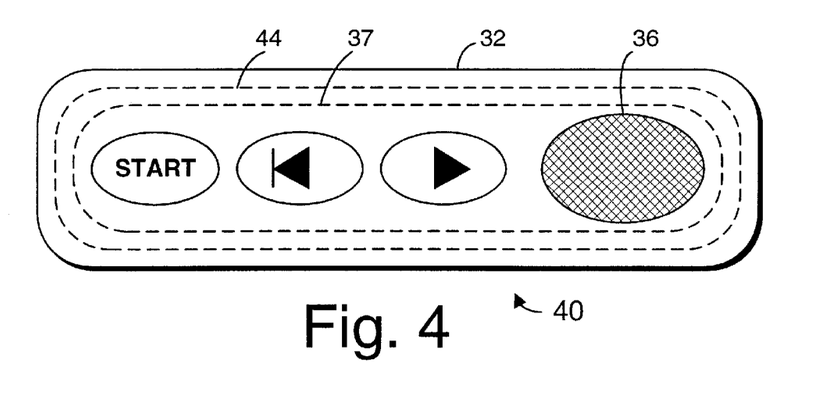
FIG. 4 shows a stylized representation of the physical appearance of one embodiment of the sequenced audio help label of FIG. 3.

FIG. 4 illustrates, in stylized drawing format, the physical appearance of one possible embodiment 40 of the sequenced audio help label of FIG. 3. The label includes the physical body 32 upon or within which the other components are disposed. The body may be constructed of a suitable size such that its controls are large enough for ease-of-use, and its transducer 36 is large enough to make a suitable volume and quality of sound, yet small enough that the overall label is useable with a consumer electronics device (not shown) or the like, to which the label's audio sequence pertains. The battery 37 may, in some embodiments, be formed in a flat and thin form factor, perhaps underlying much of the rest of the label.

In some embodiments, the label may further include an adhesive backing 44, typically on a surface other than that on which the controls and transducer are built. This adhesive or other suitable fastener system will facilitate the attachment of the sequenced audio help label to the device to which its audio sequence pertains. In some embodiments, the adhesive will be strong enough that the label is relatively difficult to remove, or even so strong that the label is essentially permanently affixed. In other embodiments, the adhesive is weak enough that the label is relatively easy to remove.

Figure 5:
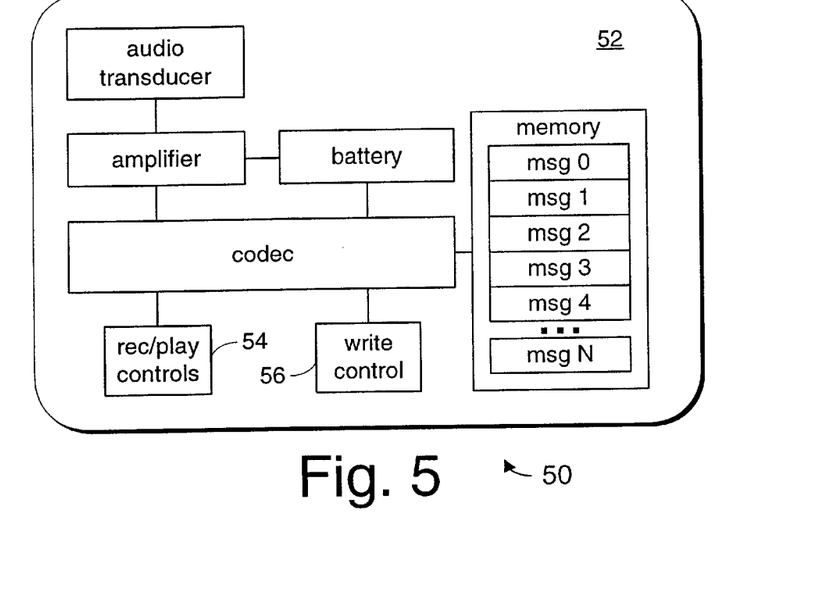
FIG. 5 shows a block diagram of one embodiment of a recordable audio help label according to the present invention.

FIG. 5 illustrates another embodiment of the invention, in which the invention is embodied as a user-recordable audio help label 50. The label 50 includes a body 52 made of suitable material, such as rigid plastic, flexible plastic, metal, or other suitable material. The label includes a memory for storing a sequence of audio messages, a codec for encoding and decoding the audio messages, a battery for providing electric power, an amplifier, an audio transducer, and one or more record and/or playback controls 54. The label may optionally also include a write control mechanism 56 for preventing erasure or over-writing of the audio messages in its memory.

Figure 6:
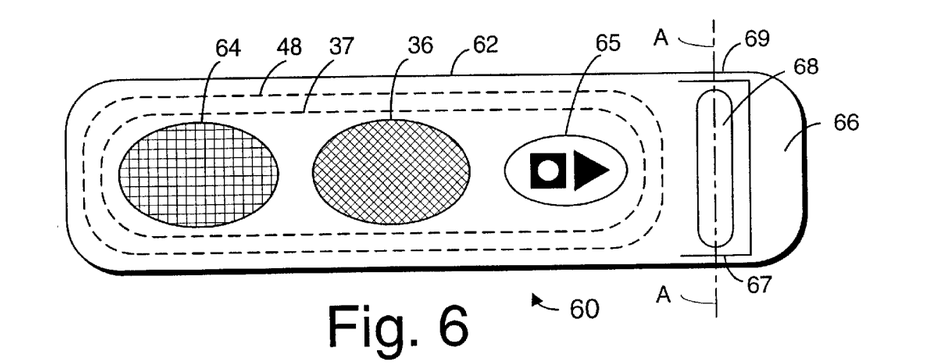
FIG. 6 shows a stylized representation of the physical appearance of the recordable audio help label of FIG. 5.

FIG. 6 illustrates, in stylized drawing format, the physical appearance 60 of one possible embodiment of the user-recordable audio help label of FIG. 5. The label includes a body 62, one or more power sources such as a battery 37 and/or a photovoltaic cell 64, and a transducer 36. The transducer performs audio output (speaker) functionality. Audio input (microphone) functionality may be performed by the transducer, or in some embodiments by a separate microphone (not shown). The label also includes one or more controls, such as a rec/play button 65. In one mode of operation, a single rec/play button triggers playback when it is quickly pressed and released, and triggers recording operation when it is pressed and held down, with recording ending upon its release.

In one embodiment, the write control mechanism may include a breakaway portion 66 of the body 42. In one mode, when this portion or tab is broken off from the main body at imaginary dashed line A, a write-enabling wire or trace 67 is severed, disabling write capability of the memory. In one embodiment, the breakaway portion may be formed, and the breakaway line determined, by suitably manufacturing a weak spot or a hole 68 through the body, such that the body has weak spots 69. Other write-control mechanisms are within the contemplation of this invention; the breakaway tab example is only by way of illustration, and not limitation.

In FIGS. 4 and 6, the codec, amplifier, and interconnections are omitted, for ease of illustration.

Figure 7:
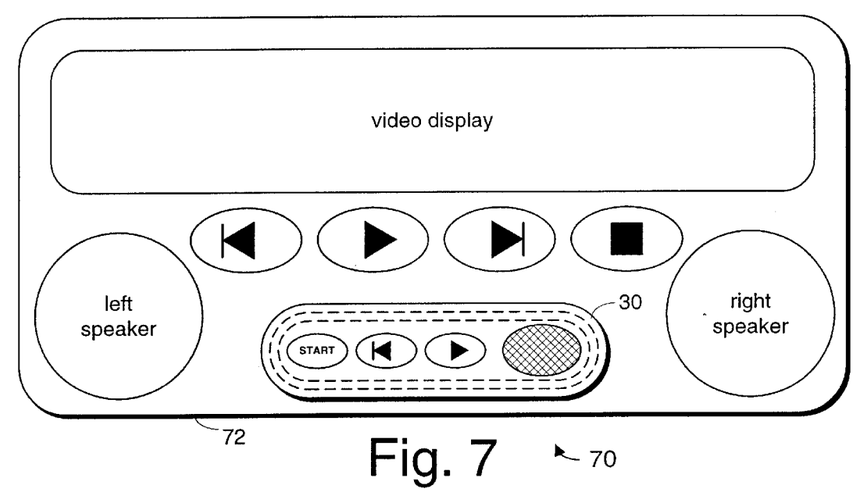
FIG. 7 shows a system including a consumer device such as a portable stereo and a sequenced audio help label affixed to the consumer device.

FIG. 7 illustrates a system 70 including the label 30 (or, alternatively, 50) affixed to e.g. a consumer electronics device 72 such as a processor-driven MP3 player stereo system. This is, of course, only one of countless examples of systems which could be constructed by affixing the audio sequence label of the present invention.

Figure 8:
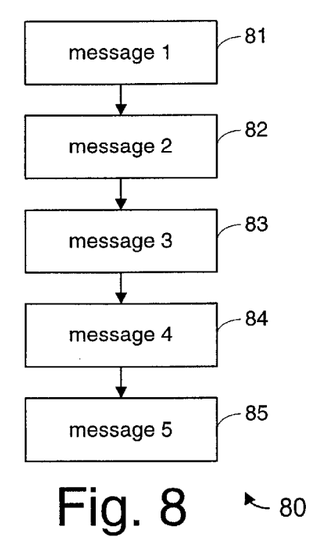
FIG. 8 shows a linear sequence of audio messages.

FIG. 8 illustrates one exemplary embodiment of an audio sequence 80, which includes a first or initial message 81 which is played in response to the user pressing the start button or the play button if play has not already begun through the sequence. After the first message, play proceeds linearly through one or more next sequential messages; in the example shown, there are four such messages 82–85.

Figure 9:
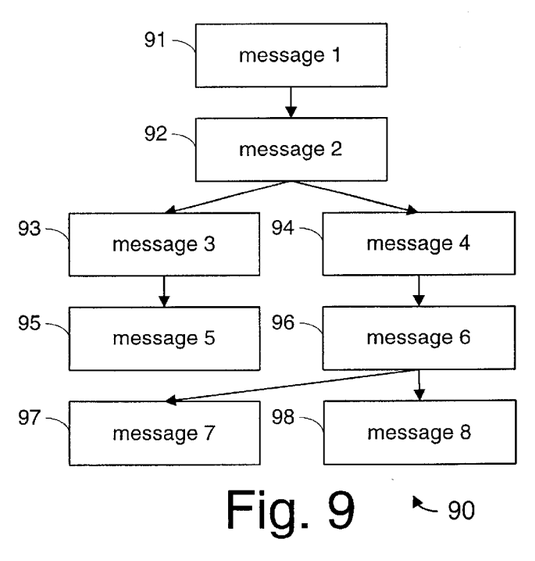
FIG. 9 shows a non-linear sequence of audio messages.

FIG. 9 illustrates another exemplary embodiment of an audio sequence 90, which includes a first or initial message 91. After the first message, play will proceed to a second message 92. After play of the second message, there is a branch or decision which is made, such as based upon input from the user, to next play either a third message 93 or to a fourth message 94. If the sequence of play was directed to the third message, upon its completion, the sequence will next go to a fifth message 95 and end. If, however, the sequence went from the second message to the fourth message, upon completion of the fourth message, play will next go to a sixth message 96. After the sixth message, play will go to either a seventh message 97 or an eighth message 98, again based upon some decision criterion such as input from the user, or perhaps from some sensor (not shown) or other factor.

The skilled reader will appreciate that FIG. 9 illustrates only one example of a branched sequence structure or tree, and that various modifications and alternatives may be used instead. For example, it is not necessarily the case that the structure is strictly a tree; there may be loops, there may be re-connections between branches, there may be more than two branches to take from any given node, and so forth. In some embodiments, there may even be multiple starting points or "first messages" between which the user or the label itself may choose.

Figures 10, 11:
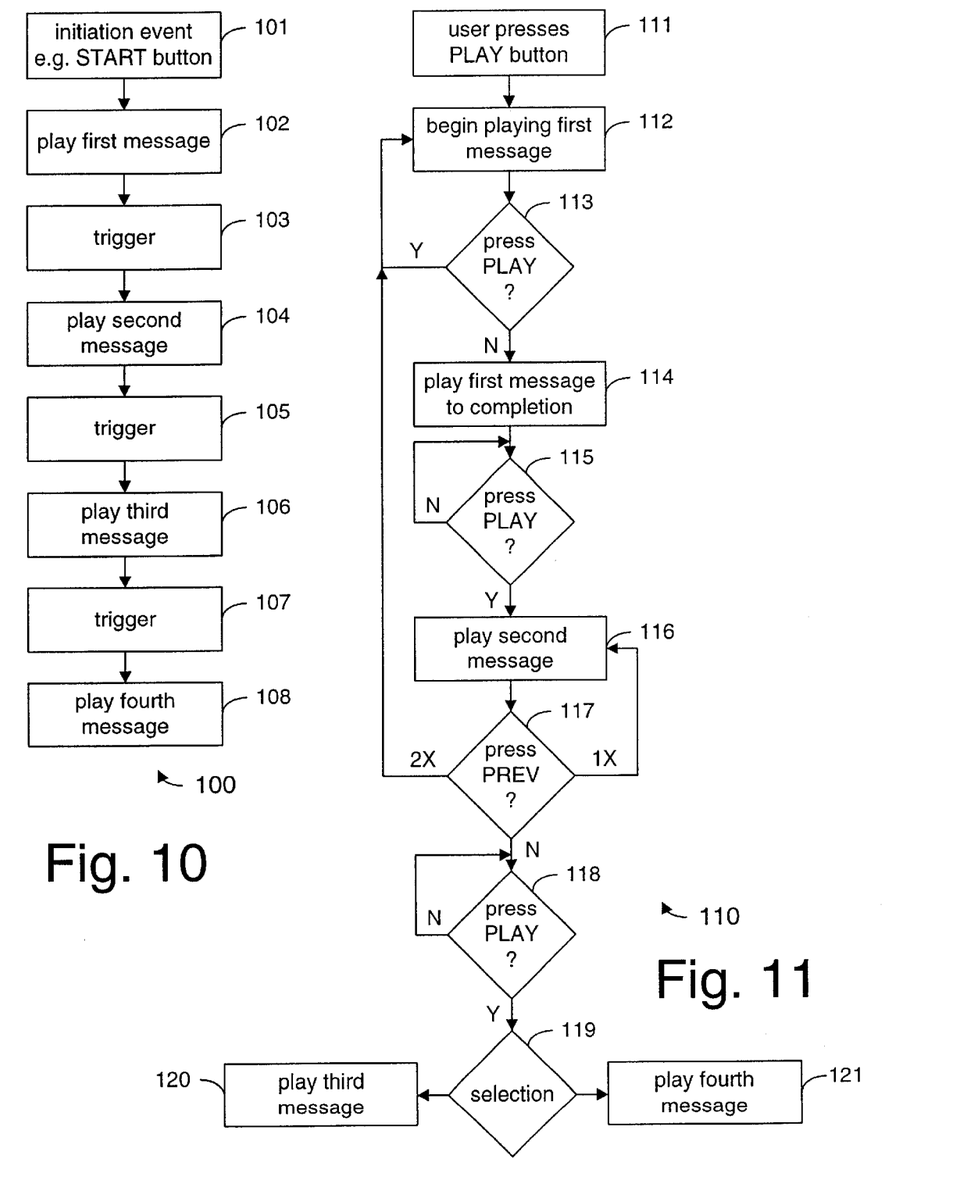
FIG. 10 shows a flowchart illustrating a method of playing a linear sequence of audio messages.
FIG. 11 shows a flowchart illustrating a method of playing a non-linear sequence of audio messages.

FIG. 10 illustrates an exemplary embodiment of a method 100 of operation of an audio sequence help label or the like in which the audio sequence is linear, with no branches. Upon receiving (101) an initiation event, such as the user pressing the START button, the method begins and the first message is played (102). After completion of the first message, play of the sequence pauses or halts until the label receives (103) a triggering event, such as the user pressing the PLAY button, or a predetermined period of time expiring after completion of the first message, a sensor detecting an external event, or the like. The label plays (104) the second message, then waits to receive (105) a subsequent trigger event, in response to which it will play (106) the third message. A subsequent trigger event (107) causes play (108) of the fourth and final message in the sequence.

FIG. 11 illustrates an exemplary embodiment of a method 110 of operation of an audio sequence help label or the like in which the audio sequence is not strictly linear. FIG. 11 illustrates additional principles which may be used in other methods, such as that of FIG. 10. The label receives (111) a first event, such as the user pressing the START button or, in simpler embodiments of the label lacking a dedicated START button, a PLAY button or the like, and in response to that event begins playing (112) the first message in the sequence. If (113), during play of the first message, the user re-presses the PLAY button or the START button, the label will jump back to the beginning of the first message. In some embodiments, press of the START button at any time may cause the sequence to begin from the beginning of the first message. In some embodiments, press of the PLAY button or the PREV button may cause the label to restart the current audio message.

If the user does not interfere, the label will play (114) the first message to completion, after which it will wait (115) for the user to trigger play of the next message, such as by pressing the PLAY button. In response to this input, the label plays (116) the second message in the sequence.

If, during play of the second message or any subsequent message, the user presses (117) the PREV button, play may jump to the beginning of the current message. In some embodiments, this is in response to a single (1×) pressing of the PREV button, and additional pressings (e.g. 2×) of the PREV button will cause play to back up to previous messages.

Without user interference, the label will play the second message to completion, then wait (118) for the user to indicate that he or she wishes to hear the next message in the sequence.

In non-linear sequences, the label may have the user make a selection (119) between two or more possible next messages. For example, if the user indicates a third message, the label will play (120) the third message, otherwise it may play (121) a fourth message.

The reader will appreciate that, for simplicity, the label and its methods and sequences have been described with reference to audio messages, and that the invention may equally well be used with other types of messages, such as a video message sequence, a text message sequence, or any other suitable form of message sequence, including mixtures thereof.

Other enhancements may be made, within the scope of this invention. For example, the sequenced audio help label (in either a linear or non-linear mode) may be programmed such that it becomes inoperative after a predetermined number of plays. Individual messages may have their own respective play count limits, after which they are skipped in the sequence. In yet another embodiment, the sequenced audio help label may become inoperative after a predetermined message has been played, such as a last one in the sequence, allowing the user to restart or replay as much as he or she wishes, until completing the sequence once.

Figure 12:
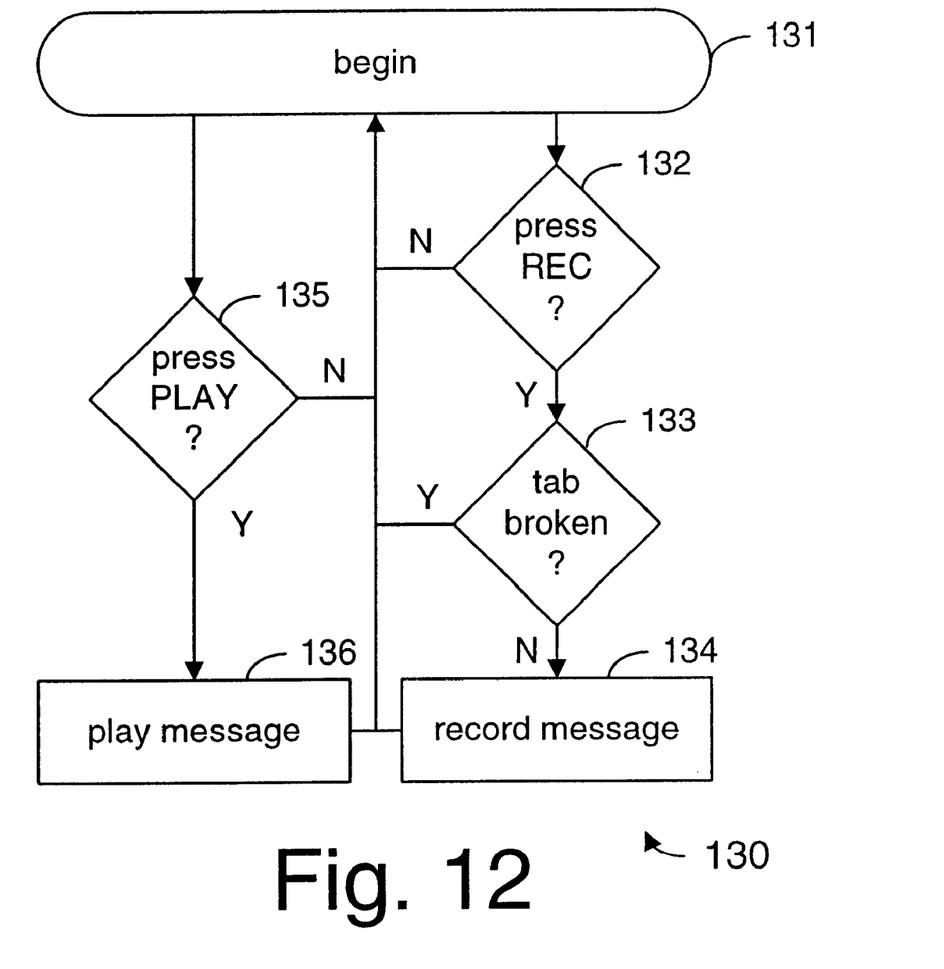
FIG. 12 shows a flowchart illustrating a method of operating a user-recordable help label.

FIG. 12 illustrates an exemplary embodiment of a method 130 of operation of a recordable sequenced audio help label. Operation begins (131) in a state in which the label is ready to accept a control input from the user. If (132) the user presses the RECORD button, and if (133) the write control mechanism has not been activated (e.g. the breakaway tab has not been broken off), the label records (134) the audio message from the user or other suitable source, then returns to the ready state (131). If (135) the user presses the PLAY button, the label plays (136) the recorded audio message, and returns to the ready state.

Various enhancements of this simplified method will be apparent to the skilled reader, based on other teachings in this disclosure. For example, the user may record a sequenced series of messages, such as by pressing and holding down the RECORD button while speaking the first message, releasing the RECORD button to demark the end of the first message, then pressing and holding down the RECORD button while speaking the second message, and so forth, to create a linear sequence. In some embodiments, the label may provide a mechanism for the user to delete a message or a complete sequence, such as by, for example, pressing the RECORD button rapidly five times in succession. In some embodiments, the label may provide for the complete or partial overwriting of a currently playing message, such as in response to the user pressing the RECORD button during playback. These and other such modifications and combinations will be appreciated by the skilled reader, and need not be set forth in minute detail in this disclosure.

The reader will appreciate various usage models for any particular embodiment of the invention. For example, a user-recordable sequenced audio help label may be embodied as a "mobile ownership tag" into which the user may record messages such as "this cellular telephone belongs to Ed Clapper" and "return postage guaranteed" and "please mail to 1313 Mockingbird Lane" and "or call my home phone at 555-1234", or the like.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc.

form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a body;
   a storage in said body to store at least two audio messages;
   a transducer in said body;
   a trigger in said body;
   logic in said body responsive to said trigger to play one of said messages via the transducer; and
   a breakaway portion of said body which, when activated, prevents further recording of user-recordable messages into said storage.

2. The apparatus of claim 1 further comprising:
   a power source.

3. The apparatus of claim 2 wherein the power source comprises a battery.

4. The apparatus of claim 2 wherein the power source comprises a photovoltaic cell.

5. The apparatus of claim 2 further comprising:
   a body to which the storage, transducer, trigger, and logic are coupled; and
   adhesive coupled to the body.

6. The apparatus of claim 5 wherein the adhesive is strong enough to substantially permanently affix the apparatus to another device.

7. The apparatus of claim 5 wherein the adhesive is weak enough to enable removal of the apparatus from a device without harming the device.

8. The apparatus of claim 7 wherein the adhesive is further weak enough to enable removal of the apparatus from the device without harming the apparatus.

9. The apparatus of claim 1 wherein the trigger comprises a plastic dome switch.

10. The apparatus of claim 1 wherein the trigger comprises a start button to which the logic is responsive to play a first message in the sequence.

11. The apparatus of claim 10 wherein the trigger further comprises a previous button to which the logic is responsive to play a previous message in the sequence.

12. The apparatus of claim 11 wherein the trigger further comprises a next button to which the logic is responsive to skip to and play a next message in the sequence.

13. The apparatus of claim 11 wherein the logic is further responsive to the previous button to restart play of a current message if the previous button is activated within a predetermined period from a start of the current message.

14. The apparatus of claim 1 wherein the logic comprises a flex circuit and the apparatus further comprises a flexible body.

15. A user-recordable apparatus comprising: a body;
   a record trigger coupled to the body;
   logic responsive to the record trigger to record user-recordable messages;
   storage for storing the user-recordable messages and coupled to the body;
   a play trigger coupled to the body;
   an output device coupled to the body;
   logic responsive to the play trigger to play one of the user-recordable messages via the output device; and
   a portion of said body to be broken away, and when broken away, prevents further recording of user-recordable messages into the storage.

16. The user-recordable apparatus of claim 15 wherein:
   the user-recordable messages comprise audio messages; and
   the output device comprises a transducer.

17. The user-recordable apparatus of claim 15 wherein:
   the user-recordable messages comprise video messages; and
   the output device comprises a video display.

18. The user-recordable apparatus of claim 15 further comprising:
   adhesive coupled to the body to affix the user-recordable apparatus to another object.

19. The user-recordable apparatus of claim 15 further comprising: a power source coupled to the logic.

20. The user-recordable apparatus of claim 19 wherein the power source comprises a battery.

21. The user-recordable apparatus of claim 19 wherein the power source comprises a photovoltaic cell.

22. The user-recordable apparatus of claim 15 wherein the breakaway body portion comprises a breakaway tab coupled to at least one of the logic and the storage.

23. The user-recordable apparatus of claim 15 wherein said breakaway body portion comprises a punch hole coupled to at least one of the logic and the storage.

24. The user-recordable apparatus of claim 15 wherein the body comprises a flexible plastic and the logic comprises a flex circuit.

25. The user-recordable apparatus of claim 15 having a thickness of no greater than three millimeters.

26. The user-recordable apparatus of claim 15 wherein the output device consists only of a transducer.

27. The user-recordable apparatus of claim 26 wherein the transducer functions as the output device and also as an input device for receiving an audio message from a user.

* * * * *